United States Patent [19]

Bausch et al.

[11] Patent Number: 4,784,236

[45] Date of Patent: Nov. 15, 1988

[54] FOUR-WHEEL DRIVE VEHICLE

[75] Inventors: Paul Bausch, Hattenheim; Hans-Peter Hemmer, Augustin, both of Fed. Rep. of Germany

[73] Assignee: General Motors Corporation, Detroit, Mich.

[21] Appl. No.: 29,334

[22] Filed: Mar. 23, 1987

[30] Foreign Application Priority Data

Apr. 3, 1986 [DE] Fed. Rep. of Germany ....... 3611093

[51] Int. Cl.4 ............................................. B60K 17/35
[52] U.S. Cl. .................................... 180/249; 74/695; 74/785; 180/197
[58] Field of Search ............... 180/247, 248, 249, 250, 180/197; 74/695, 700, 701, 705, 785, 844

[56] References Cited

U.S. PATENT DOCUMENTS 4,562,897  1/1986  Renneker ........................ 74/700 X
4,576,061  3/1986  Yamakawa et al. ............ 180/247 X
4,605,087  8/1986  Ashauer et al. ...................... 180/248
4,691,593  9/1987  Mueller ............................ 74/705 X

FOREIGN PATENT DOCUMENTS 3514947  10/1986  Fed. Rep. of Germany ...... 180/249
55-83617   6/1980  Japan ................................. 180/248
3534999   4/1986  PCT Int'l Appl. ................. 180/149
2057987   4/1981  United Kingdom ............... 180/248

Primary Examiner—John J. Love
Assistant Examiner—Charles R. Watts
Attorney, Agent, or Firm—F. J. Fodale

[57] ABSTRACT

A four-wheel drive vehicle has a permanently driven axle. A planetary gear set and viscous clutch are located in the power train leading to the second axle. The annular gear of the planetary gear set is mounted rotatably and can be stopped by a brake band. When the brake band is tensioned, the four-wheel drive, which is running via the viscous clutch, is in the state of readiness, while it is ineffective when the brake band is released.

17 Claims, 6 Drawing Sheets

FOUR-WHEEL DRIVE VEHICLE

BACKGROUND OF THE INVENTION

The present invention pertains to a four-wheel drive vehicle in which the wheels of one axle are driven by means of a clutch, especially a viscous clutch, which is located in the power train between the front and rear axles and which operates automatically as a function of the driving conditions.

A viscous clutch only transmits very small torques in the case of small speed differences between coupled shafts whereas the viscous clutch transmits very large torques at large speed differences. Depending on the location within the power train, the viscous clutch operates either as a central differential automatically locking as a function of the driving conditions or as a combined central differential and axle differential. During normal driving operation of the vehicle, there are only small differences in speed between the wheels of the two axles. The viscous clutch correspondingly transmits a small drive torque, and the drive characteristics essentially correspond to those of a two-wheel drive vehicle with only one driven axle. However, if there are very large differences in speed between the wheels, which occur, i.e., on wet ice-or snow-covered or gravel roads, the viscous clutch "locks-up", and depending on the location of the viscous clutch, the driving characteristics are those of a four-wheel drive vehicle with a locked central differential or with a locked central differential and a locked axle differential. Consequently, a permanently ready four-wheel drive is achieved with a viscous clutch.

However, the speed difference-dependent coupling achieved with the viscous clutch between the front and rear axles of a vehicle is not always desirable. During the operation and the maintenance of a four-wheel drive vehicle with a viscous clutch, there are a number of situations in which one would rather do without the torque coupling of the front and rear axles via the viscous clutch.

It was proposed before in DE-OS No. 33 17 247 that a controllable auxiliary clutch be mounted in the power train of a vehicle together with the viscous clutch to permit torque coupling and uncoupling of the drive. The prior art auxiliary clutch is designed as an overrunning grip roller and expanding friction clutch which can be automatically engaged and disengaged in terms of torque, or an hydraulically or electromagnetically operated disengaging clutch. It ensures that no torque is transmitted via the power train between the front and rear axles of the vehicle during operation of the service brake, so that the rear wheels are not locked during the braking of the front wheels.

The auxiliary clutch designs known from DE-OS No. 33 17 247 are complicated and bulky, and they cannot be easily integrated within the power train of a vehicle, and their control does not guarantee that the torque coupling of the vehicle axles is interrupted in all situations in which it appears desirable.

SUMMARY OF THE INVENTION

The object of the present invention is to provide an auxiliary coupling for a four-wheel drive vehicle having a viscous clutch between the axles which is of a rather simple, compact design, which can be integrated within the power train in a simple manner and which is controlled in an optimal manner with respect to all driving, maintenance and test situations.

To accomplish this objective, it is proposed according to the present invention to provide a planetary gear train between the axles which is used as the auxiliary clutch, and controllable means which act on the planetary gear train for locking a transmission member.

According to the present invention, the planetary gear train also has the function of an auxiliary clutch in the power train in which the viscous clutch is located, which leads to a simple, compact, wear-resistant and low-loss transmission design.

In a preferred embodiment, the annular gear of the planetary gear train is mounted rotatably and can be stopped by means of a brake. The space requirement of this arrangement is similar to that of a planetary gear train having an annular gear firmly attached to the body, i.e., it is of an extremely compact design. As a part of the planetary gear train located radially on the outside, the annular gear is also suitable for being subject to the action of a brake. The planetary gear train can be driven via the planet wheels and the power can be taken off via the central gear.

The annular gear can be fixed by the brake during normal driving of the vehicle. The torque of the axles is now coupled via the viscous clutch and the four-wheel drive is now permanently in a ready-to-operate position. However, the annular gear is released by means of an appropriate control unit by releasing the brake, and the torque coupling of the axles is terminated when certain driving or test conditions occur.

The control unit can receive, as input quantities, especially a signal characterizing the positions of the brake pedal and the accelerator pedal, as well as a signal characterizing the on state of the ignition. Further possible input quantities for the control unit are the signal from a steering angle sensor and the signal from a temperature sensor on the hydraulic clutch, and possibly a signal characterizing the engine speed and the signal from a timer. The control unit forms an output signal which activates the brake for the annular gear from these input quantities.

In an alternative form of operation of the present invention, the annular gear of the planetary gear train is released during normal driving operation. The four-wheel drive per se is not in the steady state of readiness otherwise guaranteed by the viscous clutch, but is switched on by braking the annular gear. This is associated with a low power loss in the transmission while all possible uses of a viscous clutch remain otherwise intact; in particular, the viscous clutch forms a central differential or combined central differential and axle differential of a relatively simple design. The annular gear can be stopped by braking by an operating action or automatically, and in the latter variant, the speed for the front axle and that of the rear axle are preferably monitored, and if a certain difference in speed is exceeded, the brake acting on the annular gear is allowed to act. For example, the corresponding sensors of an antilocking system can be used to monitor the speed.

The gearing mechanism described is not markedly inferior to a sole viscous clutch in terms of the promptness with which the four-wheel drive starts to operate.

To brake the annular gear of the planetary gear train, it is possible to use a brake band which is looped around the annular gear. A finite control element actuated by the motor oil pressure is preferably used to tension the brake band. This has the advantage that the brake band is released while the engine is not running, the annular gear is correspondingly released, and the coupling of the torques of the front and rear axles by the viscous clutch is abolished, so that damage to the viscous clutch cannot occur especially during towing of the vehicle with a raised axle.

The vehicle according to the present invention can have a preferably transversely mounted front engine. Its main driving axle is preferably the front axle, while the viscous clutch and the planetary gear train, which performs the function of an auxiliary clutch, are located in a power train leading to the rear axle. The planetary gear train can be located behind the front axle differential and preferably immediately before the viscous clutch. However, other installation positions of the planetary gear train are also possible, i.e., at the end of a cardan shaft before the rear axle differential.

Finally, the vehicle according to the present invention may also have a standard drive with a front-mounted engine and a rear axle forming the main driving axle. A power train for the front axle is now tapped from the power train leading to the rear axle via the planetary gear train, which also performs the function of an auxiliary clutch, and via the viscous clutch.

BRIEF DESCRIPTION OF THE DRAWINGS

The present invention will be explained below in more detail on the basis of examples illustrated in drawings. The drawings which are partially schematic in nature show the following.

DESCRIPTION OF THE PREFERRED EMBODIMENT

Figure 1:
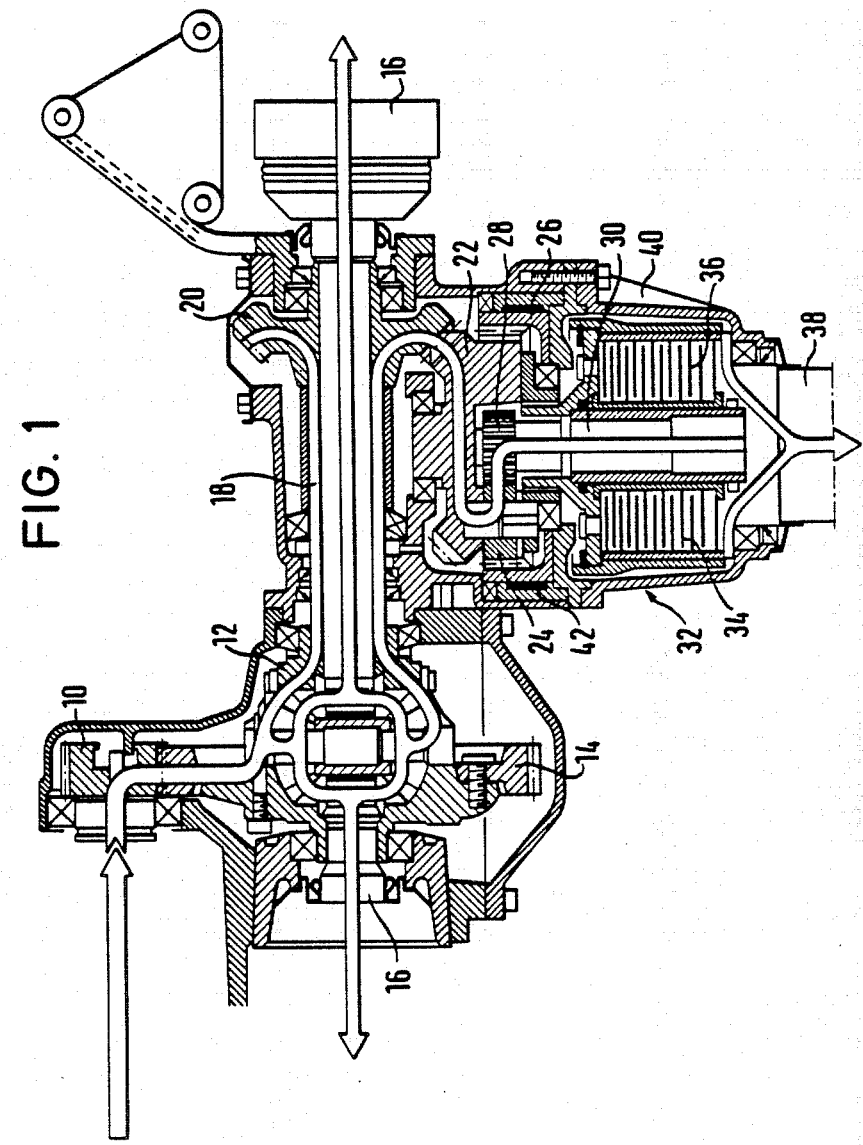
FIG. 1 shows the transfer gearbox of a four-wheel drive vehicle with a front-mounted engine in which the gearbox is arranged in the zone of the front axle differential and includes a planetary gear train with an annular gear that can be stopped by a brake band.

Referring now to the drawing, FIG. 1 shows the gearing mechanism of a four-wheel drive vehicle with a transverse front-mounted engine which is located in the zone of the front axle differential. The drive torque of the engine is transmitted via an ordinary shift transmission whose output gear 10 has external teeth and meshes with a gear 14 rigidly fixed on the differential housing 12 of the front axle differential. Part of the drive torque is thus transmitted via the front axle differential to the front axle shafts 16 and to the front wheels of the vehicle which are mounted on them. The differential housing 12 is nonrotatably connected with a hollow shaft 18 on which rigidly sits a ring gear 20. The latter meshes with a bevel gear 22 which forms a planet carrier. One of the planetary gears is shown at 24. The planetary gears 24 mesh with an annular gear 26 radially on the outside and with a central gear 28 radially on the inside. A shaft end 30, which reaches into the housing of a viscous clutch 32 and carries a drive-side disk set 34, is rigidly connected with the central gear 28. This cooperates with a driven side disk set 36 on a cardan shaft 38 leading to the rear axle. The annular gear 26 of the planetary gear train is mounted in a gearbox case 40 rigidly connected with the vehicle body. It is looped around by a brake band 42 and can be stopped by tensioning the brake band 42.

A four-wheel drive that is steadily ready to operate while the annular gear 26 is stopped by braking is created via the power train leading to the rear axle, in which the viscous clutch 32 is located. If the differences in speed between the front axle and the rear axle are small, which occurs during normal driving, the viscous clutch 32 only transmits a small torque, so that the driving characteristics of a vehicle with a front-mounted engine and front-wheel drive are essentially obtained. However, if great differences in speed occur between the front axle and the rear axle, which occurs, i.e., during slipping of one of several of the wheels on a smooth surface, the viscous clutch 32 "locks-up", and the driving characteristics of a four-wheel drive vehicle and locked central differential are obtained.

When the brake band 42 is released, the annular gear 26 rotates freely. Differences in speed between the front axle and the rear axle can be equalized now in the planetary gear train at very small frictional losses, without any change in synchronism between the drive-side and the driven-side disk sets 34, 36 of the viscous clutch 32. Consequently, the viscous clutch only transmits a small torque if any, and the front axle and the rear axle remain disengaged in terms of torque even under conditions under which the viscous clutch 32 locks when the annular gear 26 is fixed. Consequently, the four-wheel drive is put out of operation by releasing the brake band 42, and the operating characteristics of a vehicle with pure front-wheel drive is obtained.

Figure 2:
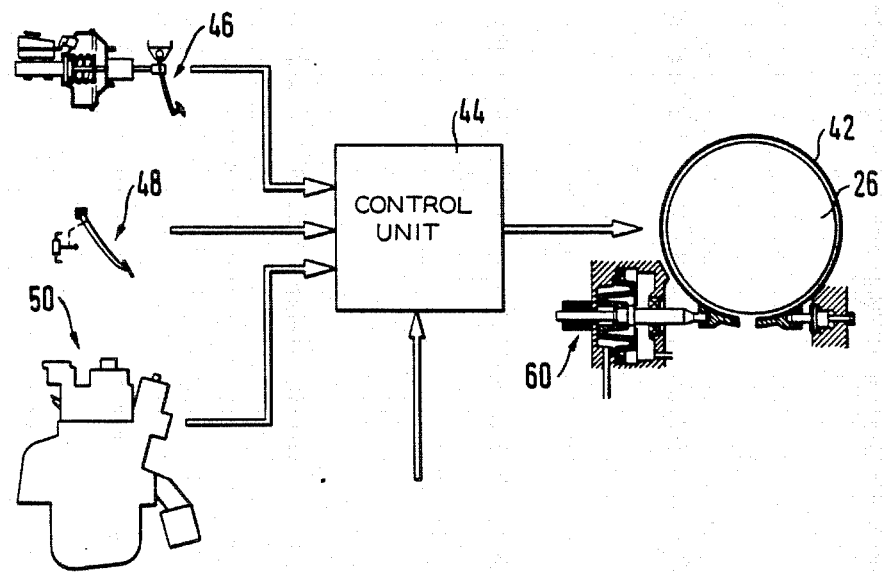
FIG. 2 shows a control unit which controls a drive for tensioning and releasing the brake band.

A drive for tensioning and releasing the brake band 42 can be controlled by a control unit 44 as is schematically shown in FIG. 2. Normal driving operation is assumed here, in which the brake band 42 is tensioned, the annular gear 26 is correspondingly stopped by braking, and the four-wheel drive running via the viscous clutch 32 is in a state of readiness. The brake band drive, which will be described below in even more detail, receives a signal from the control unit 44, on the basis of which the brake band 42 is released, and the torque coupling between the front axle and the rear axle is abolished.

The control unit 44 may receive input quantities which characterize the position of a brake pedal 46, that of an accelerator pedal 48, as well as the on position of the ignition 50. Further input quantities can come from a temperature sensor on the viscous clutch 32 and from a steering angle sensor; the latter sensor serving to recognize shunting of the vehicle. In addition, a signal characterizing the engine speed and the signal of a timer, which measures, i.e., the time interval after the ignition 50 is turned on, can be used as well. The desired output signal is formed from these input quantities in the control unit 44 for the brake band drive.

The brake band 42 can be released responsive to the service brake being operated. This operating state is recognized on the basis of the input quantities of the control unit 44 from the fact that the brake pedal 46 is depressed, the accelerator pedal 48 is in its home position, and the ignition 50 is turned on.

The brake band 42 can also be released responsive to the dragging of the vehicle. This requires a signal that the accelerator pedal 48 and the brake pedal 46 are in their respective home positions and the ignition 50 is on.

At low ambient temperatures, the brake band 42 can be released during shifting, especially for removing the vehicle from the parked position. This requires a signal that the temperature measured by the temperature sensor on the viscous clutch 32 is below a certain temperature threshold, i.e., $-5°$ C., which is indicated by a corresponding signal of the temperature sensor. Furthermore, the shifting of the vehicle must also be identified by a corresponding signal from the steering angle sensor and/or a signal characterizing the low engine speed. For example, the steering angle sensor can respond at more than one revolution of the steering wheel. As an alternative to this or in addition, the regularly necessary shifting operation can be identified by a corresponding signal of a timer shortly after the ignition 50 of the vehicle is turned on.

Figure 3:
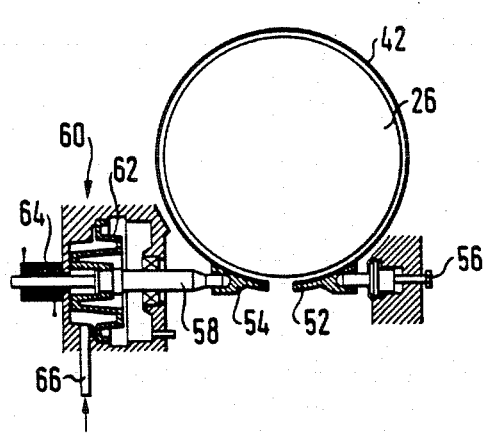
FIGS. 3 and 4 show two different designs of a brake band drive in which a hydraulic diaphragm motor operator with an electromagnetic control serves as the finite control element.
Figure 5:
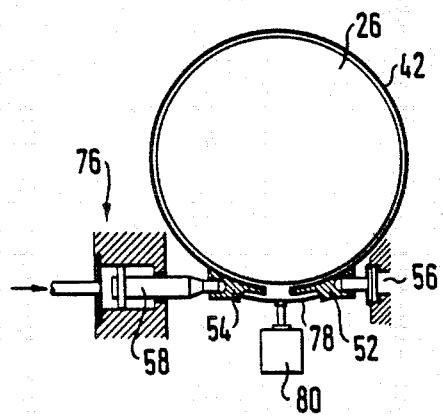
FIG. 5 shows a brake with a finite control element in the form of an hydraulic working cylinder which is switched by means of an electromagnetically actuated skip spring.
Figure 4:
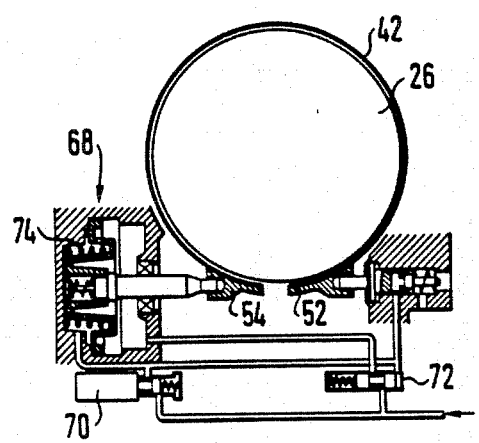

Finally, the skilled workers of a shop, perhaps even the vehicle operator, should be able to activate the control unit 44 by an appropriate switching action to release the brake band 42. It is thus possible to uncouple the torques of the axles of the vehicle especially during measurements on a roller-type dynamometer test stand and during dynamic wheel balancing. This also applies to the case in which the vehicle is being towed with a towing horseshoe, and it is rolling on the ground with only two wheels. The towing is always carried out with the engine turned off, but possibly with the key in the ignition 50, so that an additional control signal is necessary for automatically uncoupling the torques of the axles. The fact that the pressure of the motor oil drops when the engine is not running can be utilized here in particular, and it is possible to use a brake band drive actuated by the motor oil pressure as is shown in FIGS. 3 through 5.

The brake band drives are always shown viewing toward the face of the annular gear 26, which is only schematically indicated, just as the other parts of the planetary gear train. The brake band 42 loops around the annular gear 26 over nearly its entire circumference. One holder 52, 54 is attached to each end of the brake band 42. An adjusting screw 56 that is firmly attached to the body engages with the holder 52; this adjusting screw is screwed forward tangentially to the annular gear 26 and it serves to adjust the tension of the brake band 42.

The finite control element 58 of a hydraulically operated diaphragm motor operator 60 engages with the other holder 54. The finite control element 58 opposes the adjusting screw 56 and is aligned with it, and it is driven for holding the annular gear 26 in the tangential direction. The diaphragm motor operator 60 has a housing in which two work chambers are separated from each other by a diaphragm 62. The finite control element 58 is arranged in the longitudinal central axis of the housing in an axially movable manner and is connected with the internal ring of the diaphragm 62. It projects from the housing at both ends, and one of the ends reaches into the holder 54, while the other end cooperates with an electromagnet 64. The work chamber in which pressure build-up causes the finite control element 58 to extend to tension the brake band 42 is permanently under the motor oil pressure via a connection 66. The other work chamber is vented to the atmosphere and is not wired in the design shown in FIG. 3.

During operation, the diaphragm motor operator 60 tensions the brake band 42 under the effect of the motor oil pressure occurring on the diaphragm 62 while the engine is running, so that the annular gear 26 is stopped. Consequently, the four-wheel drive running via the hydraulic clutch 32 is in a permanent state of readiness. However, the hydraulic actuating power of the diaphragm motor operator 60 can be overcome by the activation of the electromagnet 64, whereby the finite control element 58 is retracted and the brake band 42 is released. This happens due to a corresponding output signal of the control unit 44. In addition, the brake band 42 is released when the engine of the vehicle is not running, and the motor oil pressure drops correspondingly. The torque coupling between the axles via the viscous clutch 32 is now abolished.

FIG. 4 shows an alternative design of a brake band drive. Here, hydraulic shifting assemblies actuated by the motor oil pressure act on the holders 52, 54 at both ends of the brake band 42. Thus, uniform introduction of the braking power over the circumference of the brake is achieved. One of the shifting assemblies is designed as a double-acting diaphragm motor operator 68 into whose work chambers the motor oil pressure can be admitted alternately via an electromagnetic switching slide 70 as well as via a brake band release slide 72. Due to the tensioning spring 74 of the diaphragm motor operator 68, the brake band 42 is tensioned when the motor oil pressure drops.

In the brake band drive shown in FIG. 5, a holder 52 is again provided with an adjusting screw 56 engaging with it at one end of the brake band 42.

The finite control element 58 of a piston-cylinder assembly 76 actuated by the motor oil pressure acts on the other holder 54 at the other end of the brake band 42. A leaf spring 78, which is actuated by means of a shifting magnet 80, is tensioned between the holders 52 and 54. However, instead of such a shifting magnet 80, a cam drive, a stepping motor, etc., can also act on the leaf spring 78. This spring does not hinder the tensioning of the brake band 42 in its off position, so that the annular gear 26 is normally braked to a stop by the oil pressure of the running engine via the piston-cylinder assembly 76. However, if the shifting magnet 80 or a similar drive is actuated, the holders 52, 54 are pushed apart from each other, and the annular gear 26 is released.

Figure 6:
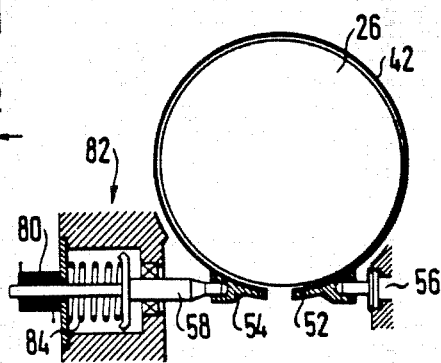
FIG. 6 shows a brake band drive with a mechanical spring-loaded unit and a counteracting electromagnetically actuated finite control element.

The illustrations in FIGS. 6 through 9 show alternative brake band drives which are not operated hydraulically. Thus, the finite control element 58 acting on the holder 54 at one end of the brake band 42 in FIG. 6 is subject to the force of a mechanical spring-loaded unit 82 having a pressure spring 84. The brake band 42 is thus normally tensioned. The finite control element 58 can be retracted by means of a shifting electromagnet 80 against the force of the pressure spring 84, whereby the annular gear 26 is released.

Figure 7:
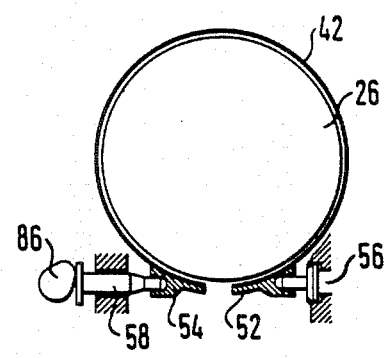
FIG. 7 shows a brake band drive with an eccentric cam which counteracts a brake band drive and is rotated by a motor operator.

FIG. 7 illustrates a brake band drive with a finite control element 58, which is acted upon by the eccentric cam 86 of a cam drive and is thereby deflected. The cam can be driven by a motor operator or a similar device.

Figure 8:
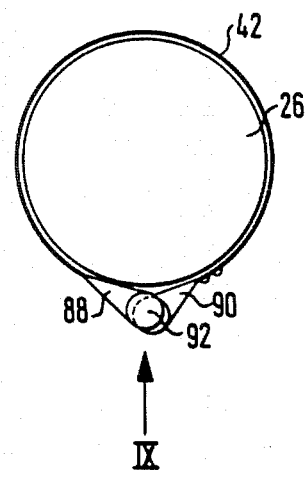
FIG. 8 shows a brake band drive with a rotatable driven eccentric shaft via which the brake band is tensioned.
Figure 9:
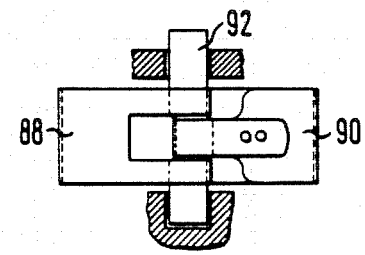
FIG. 9 shows a top view of the latter brake band drive, partially as a sectional view, with a view in direction IX according to FIG. 8.

Finally, in the design shown in FIGS. 8 and 9, the brake band 42 is tensioned with loops 88, 90 via an eccentric shaft 92. The fastening segments for the loops 88, 90 are eccentrically offset relative to one another, so that the brake band 42 can be tensioned and released by rotating the eccentric shaft 92. In the example shown, one of the loops 88 has a Y-shaped fork in its anchoring zone. An anchoring zone at the other loop 90 comes to lie in the opening of the fork in which the shaft 92 also has its eccentric part.

Figure 10:
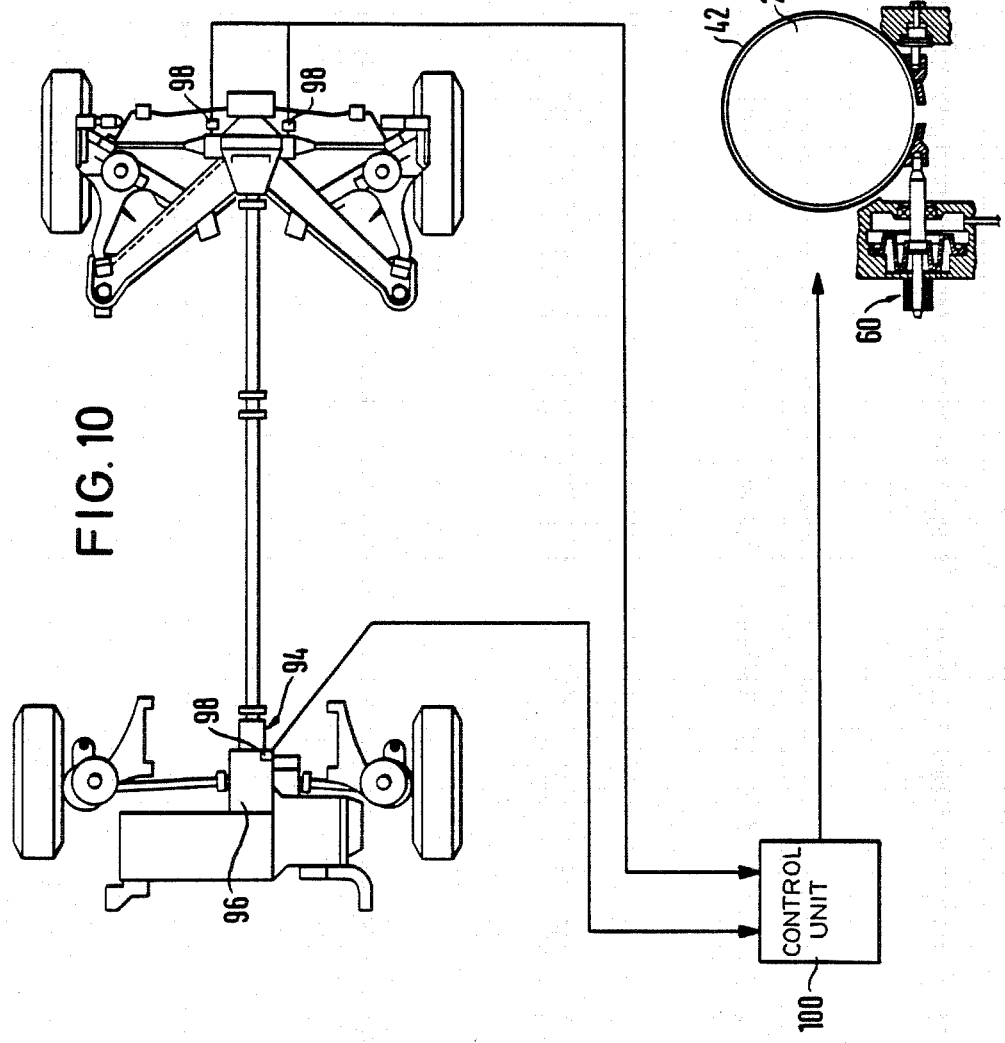
FIG. 10 shows the chassis and the power train of a four-wheel drive vehicle with a front-mounted engine and a transfer gearbox arranged in the zone of the front axle differential which includes a planetary gear drive train with an annular gear that can be stopped by a brake band, where an alternative control of the brake band drive is provided.

FIG. 10 shows an arrangement of a planetary gear train 94, which also operates at the same time as an auxiliary clutch located in the same power train as a viscous clutch.

While in the embodiments described so far the annular gear 26 of the planetary gear train was braked during normal driving operation so that the four-wheel drive was in a permanent state of readiness, the annular gear 26 shown in FIG. 10 is released during normal driving operation. A separate control procedure is necessary to brake the annular gear 26 and to put the four-wheel drive, which is running via the viscous clutch 32, into its ready position. This can be achieved, i.e., by an operating action performed by the operator, who is thus able to switch on the four-wheel drive. However, the control process can also take place automatically. According to FIGS. 10 and 11, this requires monitoring of the speeds on the transmission output shaft in the zone of the front axle and the input to the rear axle differential by means of sensors 98, for which especially the corresponding sensors of an antilocking brake system are suitable. The speeds are compared with each other in a control unit 100. If the difference signal exceeds a preset limit, a motor actuated control 104 of the brake band drive will start to operate, and the brake band 42 is tensioned, which can be especially performed by means of a motor operator with limit switches 106, but also by means of any of the above described brake band drives. A first indicator lamp 108, which indicates the state of readiness of the four-wheel drive, will light up at the same time. However, this only happens unless one or several of the above-mentioned situations is present, in which the switching on of the four-wheel drive is to be inhibited. This happens for instance when the brake pedal 46 is operated, and it is schematically illustrated accordingly in FIG. 11. However, switching on of the four-wheel drive can also be prevented during the pushing operation of the engine as well as during measuring and maintenance operations. However, special recognition of shifting operations can be omitted, because the torques of the axles are not normally coupled via the viscous clutch 32.

Figure 11:
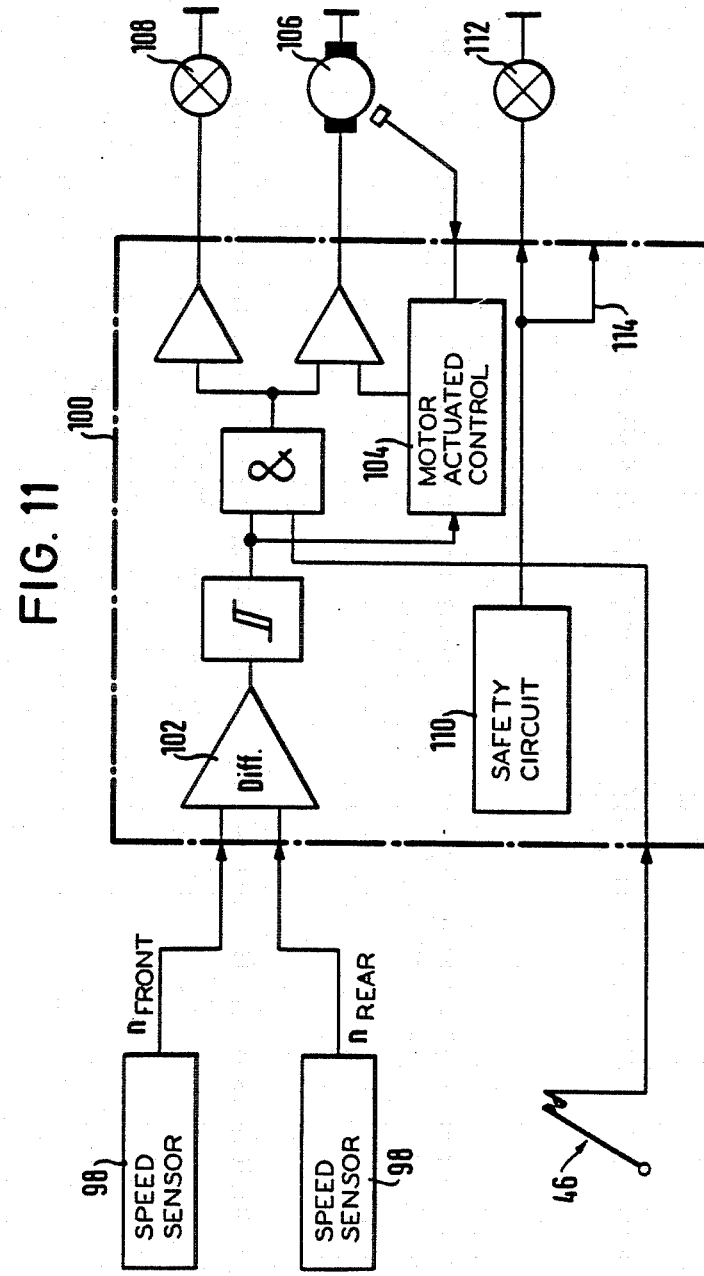
FIG. 11 shows the block diagram of a control unit for the brake band drive according to FIG. 10.

In the control circuit shown in FIG. 11, the brake band 42 is released again when the difference in speed detected during normal driving operation is so small that the viscous clutch 32 has no more effect. A safety circuit 110 monitors the sensors 98 and ensures that the brake band 42 remains always released in the case of a defect. Such a malfunction is indicated by a second indicator lamp 112. A diagnostic connection 114 facilitates trouble-shooting for the shop.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A four-wheel drive vehicle in which the wheels of a first axle are continuously driven while the wheels of a second axle are continuously driven while the wheels of a second axle are driven by a viscous clutch which is located in a power train between the first and second axles and which operates automatically depending on driving conditions, and in which the power train includes a controllable auxiliary clutch which permits torque engagement and disengagement of drive torque for the wheels of the second axle, characterized in that the controllable auxiliary clutch comprises a planetary gear train located in the power train between the first and second axles and controllable means which act on the planetary gear train for locking a transmission member.

2. A vehicle in accordance with claim 1, characterized in that the planetary gear train has an annular gear which is mounted rotatably and which can be stopped by a brake forming part of the controllable means.

3. A vehicle in accordance with claim 2, characterized in that the planetary gear train is driven via a planet carrier and power is taken off via a central gear.

4. A vehicle in accordance with claim 3, characterized in that the annular gear is stopped by the brake during normal driving operation so that four-wheel drive via the viscous clutch is in a state of readiness.

5. A vehicle in accordance with claim 4, characterized in that the controllable means includes a control unit which releases the annular gear by releasing the brake, thus disengaging the first and second axles, responsive to a predetermined operating condition of the vehicle.

6. A vehicle in accordance with claim 5, characterized in that the control unit receives input signals which characterize the position of a brake pedal and an accelerator pedal, as well as an on position of the ignition and send a signal which activates the brake of the annular gear.

7. A vehicle in accordance with claim 6, characterized in that the control unit receives input signals of a steering angle sensor and a temperature sensor installed on the viscous clutch.

8. A vehicle in accordance with claim 3, characterized in that the annular gear is released during normal driving operation, and four-wheel drive via the viscous clutch is accordingly out of action.

9. A vehicle in accordance with claim 8, characterized in that the annular gear can be stopped either by operating the brake selectively or automatically responsive to a predetermined difference in speed between the axles.

10. A vehicle is accordance with claim 3, characterized in that it has a transverse front-mounted front engine, that the first axle is the front axle, that the second axle is the rear axle and that the viscous clutch and the planetary gear train operating as the auxiliary clutch are located in the power train to the rear axle.

11. A vehicle in accordance with claim 10, characterized in that the planetary gear train is located behind a front axle differential and immediately in front of the viscous clutch.

12. A vehicle in accordance with claim 3, characterized in that the planetary gear train is located in the power train in front of a rear axle differential.

13. A vehicle in accordance with claim 3, characterized in that the first axle is a rear axle, the second axle is a front axle and the vehicle has a power train extending from a front-mounted engine to the rear axle, from which extends a power train to the front axle via the planetary gear train and the viscous clutch.

14. A four-wheel drive vehicle in which the wheels of a first axle are continuously driven while the wheels of a second axle can be driven by a viscous clutch which is located in a power train between the first and second axles and which operates automatically depending on driving conditions, and in which the power train includes a controllable auxiliary clutch which permits engagement and disengagement of drive torque in the power train, characterized in that;

the controllable auxiliary clutch comprises a planetary gear train located in the power train between the first and second axles and controllable means which act on the planetary gear train for locking a transmission member, the planetary gear train has an annular gear which is mounted rotatably and which can be stopped by a brake forming part of the controllable means;

the planetary gear train is driven via a planet carrier and the power is taken off via a central gear;

and a brake band looped around the annular gear is provided as the brake.

15. A vehicle in accordance with claim 14, characterized in that a finite control element operated by motor oil pressure is provided for tensioning the brake band.

16. A four-wheel drive vehicle in which the wheels of a first axle are continuously driven while the wheels of a second axle can be driven by a viscous clutch which is located in a power train between the first and second axles and which operates automatically depending on driving conditions, and in which the power train includes a controllable auxiliary clutch which permits engagement and disengagement of drive torque in the power train, characterized in that;

the controllable auxiliary clutch comprises a planetary gear train located in the power train between the first and second axles and controllable means which act on the planetary gear train for locking a transmission member, and the planetary gear train has an annular member which is mounted rotatably and which can be stopped by a brake forming part of the controllable means so that power is taken off a gear of the planetary gear train to drive the viscous coupling.

17. A vehicle in accordance with claim 16, characterized in that the planetary gear train is driven via a planet carrier and the power is taken off via a central gear of the gear train; and a brake band looped around the annular member is provided as the brake.

* * * * *